United States Patent
Toops et al.

(10) Patent No.: US 9,272,268 B2
(45) Date of Patent: Mar. 1, 2016

(54) CATALYSTS FOR LOW TEMPERATURE OXIDATION

(71) Applicant: UT-Battelle, LLC, Oak Ridge, TN (US)

(72) Inventors: Todd J. Toops, Knoxville, TN (US); James E. Parks, III, Knoxville, TN (US); John C. Bauer, Paducah, KY (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 14/231,828

(22) Filed: Apr. 1, 2014

(65) Prior Publication Data

US 2015/0273444 A1    Oct. 1, 2015

(51) Int. Cl.

| | |
|---|---|
| *B01D 53/56* | (2006.01) |
| *B01D 53/94* | (2006.01) |
| *B01J 8/02* | (2006.01) |
| *C01B 21/00* | (2006.01) |
| *C01B 23/00* | (2006.01) |
| *C01B 25/00* | (2006.01) |
| *C01B 31/00* | (2006.01) |

(Continued)

(52) U.S. Cl.
CPC ......... *B01J 23/8926* (2013.01); *B01D 53/9427* (2013.01); *B01J 23/52* (2013.01); *B01J 23/66* (2013.01); *B01J 23/894* (2013.01); *B01J 35/006* (2013.01); *B01J 35/0006* (2013.01); *B01J 35/008* (2013.01); *B01J 37/035* (2013.01); *B01J 37/04* (2013.01); *B01J 37/14* (2013.01); *B01J 37/16* (2013.01)

(58) Field of Classification Search
CPC ............ B01J 23/00; B01J 23/10; B01J 23/52; B01J 23/66; B01J 23/70; B01J 23/72; B01J 23/74; B01J 23/83; B01J 23/84; B01J 21/00; B01J 21/04; B01J 21/06; B01J 21/066; B01J 21/08; B01J 23/38; B01J 23/40; B01J 23/42; B01J 23/44; B01J 23/46; B01D 53/92; B01D 53/945
USPC ......... 502/243, 304, 317, 330, 331, 332, 349, 502/355, 439, 339; 423/213.5; 60/694; 422/170, 177, 180
See application file for complete search history.

(56) References Cited

U.S. PATENT DOCUMENTS

| | | | |
|---|---|---|---|
| 7,704,919 B2 * | 4/2010 | Adzic et al. | 502/344 |
| 7,727,931 B2 * | 6/2010 | Brey et al. | 502/344 |

(Continued)

FOREIGN PATENT DOCUMENTS

| | | |
|---|---|---|
| CN | 101623634 | 1/2010 |
| CN | 102078787 | 6/2011 |

(Continued)

OTHER PUBLICATIONS

Yin, Jun, Gold-Copper Nanoparticles: Nanostructural Evolution and Bifunctional Catalytic Sites, Chemical Materials, 2012, 24, pp. 4662-4674.

*Primary Examiner* — Cam N. Nguyen
(74) *Attorney, Agent, or Firm* — Edna I. Gergel

(57) ABSTRACT

The invention provides a composite catalyst containing a first component and a second component. The first component contains nanosized gold particles. The second component contains nanosized platinum group metals. The composite catalyst is useful for catalyzing the oxidation of carbon monoxide, hydrocarbons, oxides of nitrogen, and other pollutants at low temperatures.

13 Claims, 14 Drawing Sheets

(51) Int. Cl.
| | | |
|---|---|---|
| *C01B 33/00* | (2006.01) | |
| *C01B 35/00* | (2006.01) | |
| *C01G 28/00* | (2006.01) | |
| *C01G 30/00* | (2006.01) | |
| *B01J 21/00* | (2006.01) | |
| *B01J 21/04* | (2006.01) | |
| *B01J 23/00* | (2006.01) | |
| *B01J 23/02* | (2006.01) | |
| *B01J 23/08* | (2006.01) | |
| *B01J 23/10* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 23/72* | (2006.01) | |
| *B01J 23/89* | (2006.01) | |
| *B01J 23/52* | (2006.01) | |
| *B01J 37/03* | (2006.01) | |
| *B01J 37/04* | (2006.01) | |
| *B01J 37/14* | (2006.01) | |
| *B01J 37/16* | (2006.01) | |
| *B01J 35/00* | (2006.01) | |
| *B01J 23/66* | (2006.01) | |

(56) References Cited

U.S. PATENT DOCUMENTS

| | | | | |
|---|---|---|---|---|
| 7,820,291 | B2 | 10/2010 | Kim et al. | |
| 7,855,021 | B2* | 12/2010 | Adzic | H01M 4/8657 429/424 |
| 7,955,570 | B2* | 6/2011 | Insley et al. | 422/222 |
| 7,989,384 | B2* | 8/2011 | Brey et al. | 502/184 |
| 8,058,202 | B2* | 11/2011 | Brady et al. | 502/184 |
| 8,129,306 | B2* | 3/2012 | Myers et al. | 502/326 |
| 8,168,561 | B2* | 5/2012 | Virkar | 502/326 |
| 8,211,594 | B2* | 7/2012 | McGrath et al. | 429/524 |
| 8,216,961 | B2* | 7/2012 | Lee | 502/240 |
| 8,227,372 | B2* | 7/2012 | Lopez et al. | 502/182 |
| 8,314,046 | B2* | 11/2012 | Brady et al. | 502/184 |
| 8,343,627 | B2* | 1/2013 | Zhong | B01J 13/02 428/403 |
| 8,415,267 | B2* | 4/2013 | Lee | 502/242 |
| 8,450,235 | B2* | 5/2013 | Suzuki et al. | 502/325 |
| 8,461,373 | B2* | 6/2013 | Suzuki et al. | 560/103 |
| 8,664,148 | B2* | 3/2014 | Brey et al. | 502/344 |
| 8,669,202 | B2* | 3/2014 | van den Hoek et al. | 502/262 |
| 8,945,504 | B2* | 2/2015 | Archer | B82Y 30/00 252/62.56 |
| 8,969,027 | B2* | 3/2015 | Bossmann | A61K 9/0036 424/9.1 |
| 2007/0026292 | A1* | 2/2007 | Adzic et al. | 429/44 |
| 2010/0008840 | A1 | 1/2010 | Zhong et al. | |
| 2010/0086832 | A1* | 4/2010 | Lopez et al. | 429/44 |
| 2011/0086295 | A1* | 4/2011 | Lopez et al. | 429/524 |
| 2011/0311635 | A1* | 12/2011 | Stucky et al. | 424/490 |
| 2012/0214666 | A1 | 8/2012 | van den Hoek et al. | |
| 2012/0263777 | A1* | 10/2012 | Woo et al. | 424/421 |
| 2012/0270729 | A1* | 10/2012 | Osaki et al. | 502/330 |
| 2012/0289749 | A1* | 11/2012 | Asefa et al. | 568/311 |
| 2012/0296124 | A1* | 11/2012 | Asefa et al. | 564/417 |
| 2012/0316054 | A1* | 12/2012 | Lopez et al. | 502/5 |
| 2013/0059231 | A1* | 3/2013 | Hwang et al. | 429/524 |
| 2014/0057781 | A1* | 2/2014 | Stamm Masias et al. | 502/263 |
| 2014/0106260 | A1* | 4/2014 | Cargnello et al. | 429/528 |
| 2014/0194281 | A1* | 7/2014 | Osaki et al. | 502/330 |
| 2014/0206530 | A1* | 7/2014 | Shirakawa et al. | 502/330 |

FOREIGN PATENT DOCUMENTS

| | | |
|---|---|---|
| CN | 102319442 | 1/2012 |
| CN | 102350283 | 2/2012 |
| CN | 101612581 | 6/2012 |
| CN | 102068982 | 4/2013 |

* cited by examiner

Figures 8 (a) and 8 (b)
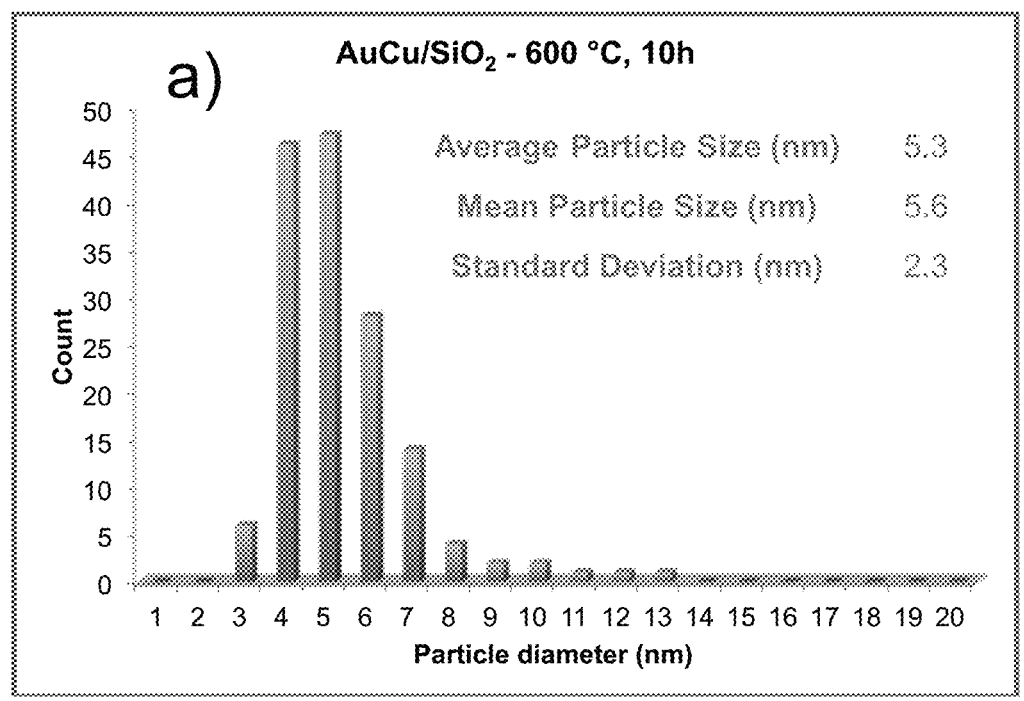
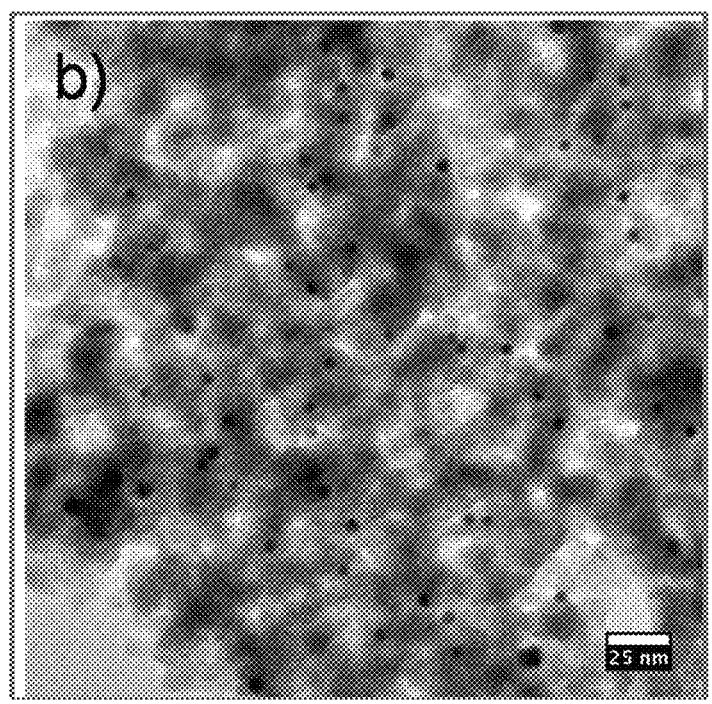

Figures 8 (c) and 8 (d)
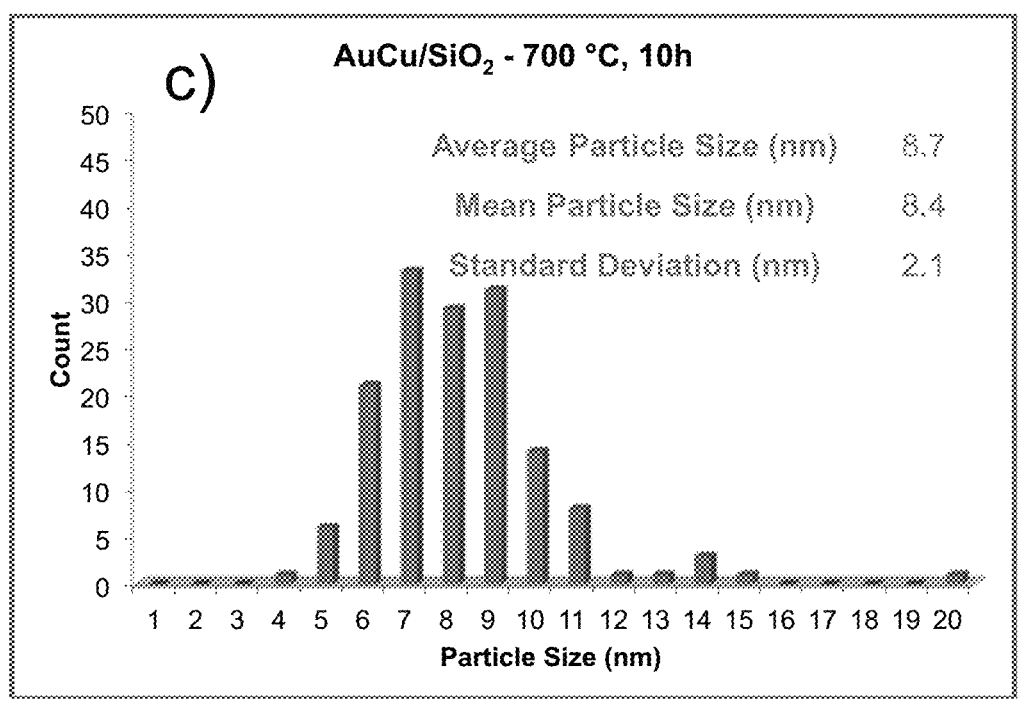
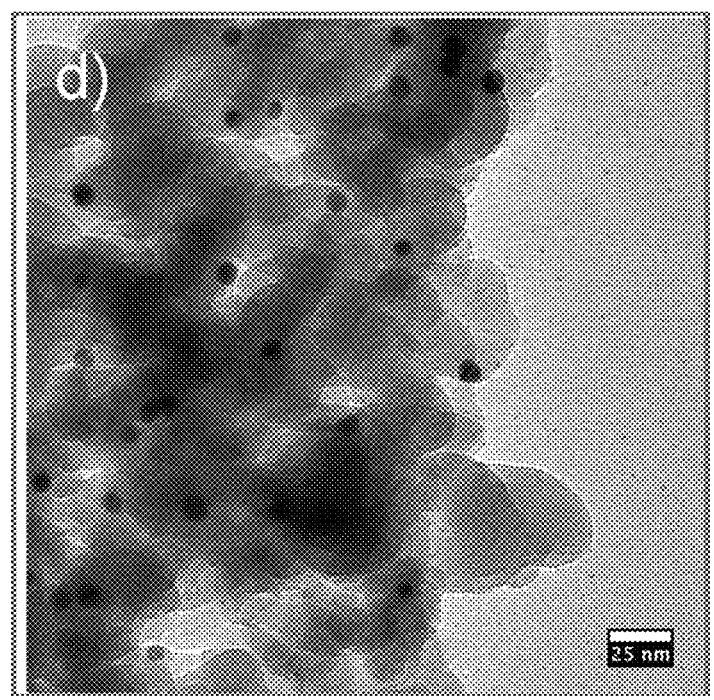

Figures 8 (e) and 8 (f)
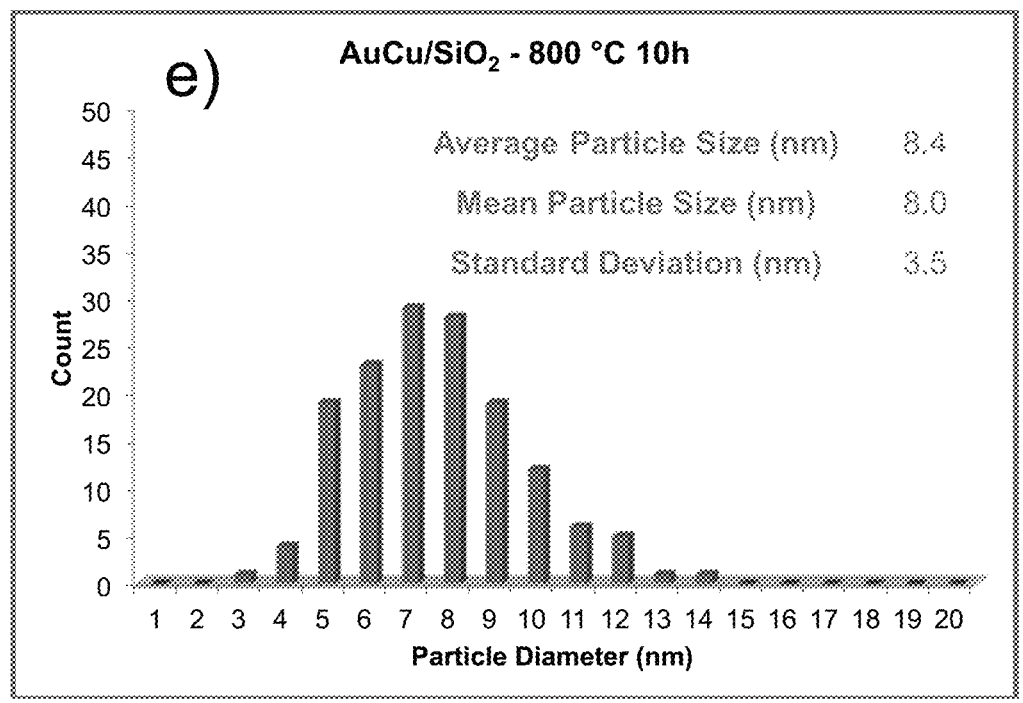
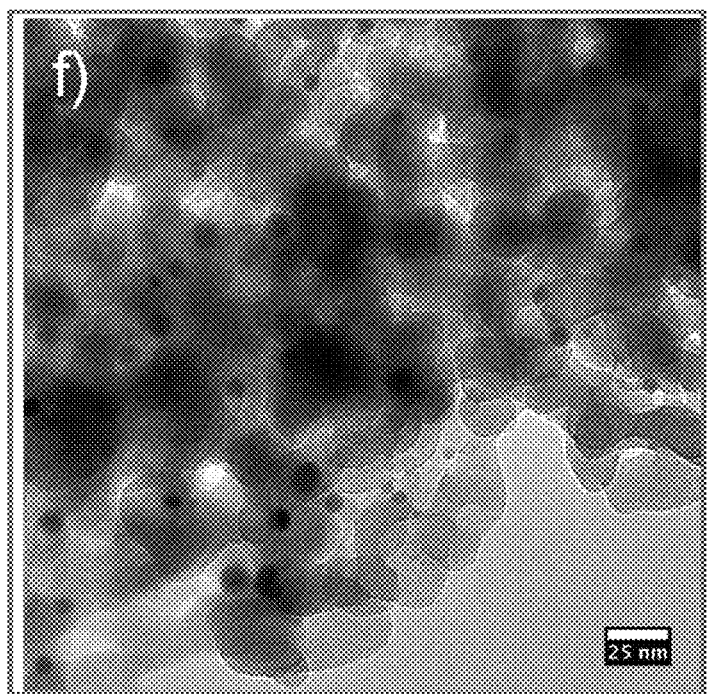

US 9,272,268 B2

CATALYSTS FOR LOW TEMPERATURE OXIDATION

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE INVENTION

The present invention provides a composite catalyst for oxidizing carbon monoxide, hydrocarbons, oxides of nitrogen, and other pollutants.

BACKGROUND OF THE INVENTION

Removing the toxic pollutants in automotive exhaust has been an intense focus of the automotive industry over the last several decades. In particular, the emissions regulations for fuel-efficient diesel engines that were implemented in 2007 and 2010 have resulted in a new generation of emissions control technologies. One of these technologies that has a multifunctional purpose is the diesel oxidation catalyst (DOC). Its function is primarily to oxidize carbon monoxide (CO) and unburned hydrocarbons (HCs) to carbon dioxide ($CO_2$) and water ($H_2O$), but also is used to oxidize a portion of the nitric oxide (NO) to nitrite ($NO_2$) for use in low temperature soot oxidation in the diesel particulate filter (DPF) and to enable the optimal $NO/NO_2$ ratio for the selective catalytic reduction (SCR) of $NO_x$ with $NH_3$ over metal-zeolites.

The active component of the DOC is typically Pt and/or Pd. These catalysts usually reach 90% conversion between 200° C. and 350° C., and consequently, the catalysts are not active under "cold-start" or low load/idling conditions. The temperature limitation is problematic since more than 50% of the emissions from an engine occur in the first 2-3 minutes after cold start. Thus, as emissions regulations become more stringent, meeting the emission regulations will require increased activity during this warm-up period. To further complicate matters, the increased Corporate Average Fuel Economy (CAFE) standards that will be implemented over the next decade will result in the introduction of more fuel-efficient engines. These engines will have even lower exhaust temperatures, which further necessitates the need for increased emissions control activity at low temperatures. Higher Pt/Pd loadings may help to increase the catalytic efficiency, but such methods would be too expensive and are more subject to particle sintering which degrades performance over time.

Other options to meet the emissions standards include hydrocarbon/NOx absorbers which operate by trapping pollutants below temperatures at which catalysts would treat them and, subsequently, releasing the pollutants once temperatures rise to a point at which a downstream catalyst can effectively treat them. However, while this pathway would help mitigate emissions at low exhaust temperatures, additional complexity and cost are drawbacks to implementation.

Thus, oxidation catalysts in emissions control systems, such as automotive exhaust that generally contain Pd/Pt require exhaust temperatures above 200° C. to operate; and under low-temperature conditions, oxidation of CO and hydrocarbons are challenging. As engine efficiency improves and exhaust temperature decreases, there is an increasing demand for high emissions control performance at low temperatures. Therefore, it becomes imperative to design new catalysts that are active at low operating temperatures.

BRIEF SUMMARY OF THE INVENTION

The above needs have been met by the present invention, which provides, in one aspect, a composite catalyst comprising a first component comprising nanosized gold particles on a solid support; and a second component comprising nanosized platinum group metals (Pt, Pd, Rh). The composite catalysts are useful for oxidizing carbon monoxide, hydrocarbons, oxides of nitrogen, and other pollutants. The composite catalyst can be useful in numerous systems, such as in a component in an exhaust system in an engine, an emission control system, a motor vehicle, etc.

BRIEF DESCRIPTION OF THE DRAWINGS

FIG. 8. The size distribution histogram and TEM image of $AuCu/SiO_2$ after thermal ageing at (a, b) 600° C., (c, d) 700° C. and (e, f) 800° C. under 10% $O_2$, 1% $H_2O$ and Ar for 10 h.

DETAILED DESCRIPTION OF THE INVENTION

Figure 1:
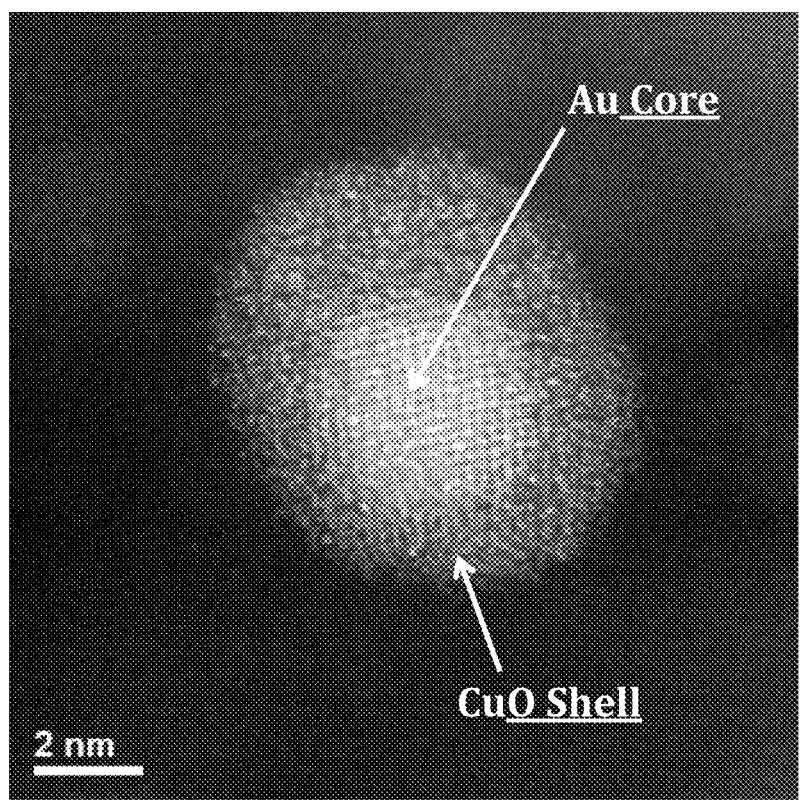
FIG. 1. TEM micrograph of a catalytically active core-shell (Au—CuO) nanoparticle.

In one aspect, the invention provides a composite catalyst capable of low temperature oxidation, such as oxidation of carbon monoxide (CO), oxides of nitrogen, hydrocarbons, and other pollutants. A composite catalyst in accordance with the claimed invention contains a first and second component.

The first component comprises nanosized gold (Au) particles. The term "nanosized" as used herein refers to particles having a diameter in the nanosize range. The nanosized particles generally have a size of no more than about 1000 nm. In different embodiments, the nanosized objects have a size of precisely, about, at least, up to, or less than 900 nm, 800 nm, 700 nm, 600 nm, 500 nm, 450 nm, 400 nm, 350 nm, 300 nm, 250 nm, 200 nm, 150 nm, 100 nm, 90 nm, 50 nm, 40 nm, 30 nm, 20 nm, 10 nm, 5 nm, 4 nm, 3 nm, 2 nm, or 1 nm, or a size within a range bounded by any two of the foregoing values. As used herein, the term "about" generally indicates within ±0.5, 1, 2, 5, or 10% of the indicated value (for example, "about 50 nm" can mean 50 nm±2%, which indicates 50±1 nm or 49-51 nm). For example, the nanosized particles useful in the present invention can have a diameter from 1-100 nm, 5-90 nm, 10-50 nm, etc.

In one embodiment, the gold particles can be solely comprised of gold. For example, the first component can be a gold particle. In other embodiments, the gold particle can be comprised of gold mixed with another metal or metal oxide. In this case, the particle may be similar to an alloy where the gold and other metal atoms are homogeneously mixed in the particle; or, the particle may have structure with distinct regions of gold and distinct regions of the other metal or metal oxide. Metal oxides useful in the present invention include copper oxide, iron oxide, nickel oxide, manganese oxide, tin oxide, palladium oxide, and silver oxide.

In yet other embodiments, the gold particles can comprise a gold core surrounded by a metal oxide shell. Such gold core/metal oxide shell nanoparticles contribute to the unique catalytic properties of the composite catalysts of the invention.

The nanosized gold particles useful in the present invention are on a solid support. The solid supports generally have a high surface area which facilitates the dispersion of the active catalyst gold particles. Such a system helps prevent sintering of the gold particles which results in agglomeration of the gold and reduced catalytic activity.

The support materials are generally metal oxides for automotive catalysts and serve three primary purposes: (1) as mentioned, they provide high surface area to support the dispersion of the active metal component of the catalyst, (2) they provide pores and pathways for the gaseous stream to interact with the active metal component, and (3) they provide thermal and mechanical durability in hot flowing exhaust often occurring in an environment with vibration and other physically challenging conditions.

In one embodiment the gold particles are distributed over the support, maximizing their surface area and thereby reactivity of the catalyst. Solid supports useful in the present invention include $SiO_2$, $CeO_2$, $ZrO_2$, $Al_2O_3$, other metal oxides, and combinations thereof. In one embodiment, the solid supports prevent the nanosized gold particles from sintering.

The nanosized gold particles can be applied (e.g., affixed) to the solid support by any method known to those in the art. Suitable methods include, for example, impregnating the solid support with the nanosized gold particles, or preparing a homogenous solution followed by co-precipitation and calcination. Often, an aqueous solution of the metal in a precursor complex is used, and the solution is applied to the support material with the metal complex precipitating onto or ion exchanging with the support surface. Subsequent drying and calcining to remove the precursor from the metal results in the metal left on the support surface as a nanoparticle. As known to those skilled in the art, the effectiveness of the technique to create well dispersed and active catalysts is dependent on a number of variables in the process including: the solution concentration, precursor chemistry, metal oxide support chemistry, method of wetting the support, drying temperature, calcination temperature, etc.

The second component of the composite catalyst comprises nanosized platinum group metals. The term nanosized is described above. Platinum group metals useful in the composite catalyst of the present invention include Platinum, Osmium, Iridium, Ruthenium, Rhodium, and Palladium. Such platinum group metals fall in groups 8, 9, and 10 and period 5 and 6 of the periodic table.

The first component and the second component of the composite catalyst of the invention can be combined by any method known to those skilled in the art. For example, the composite catalyst can be a physical mixture of a support with the first component and another support with the second component. Physical mixtures can be made by any method known in the art. Or, the composite catalyst may be created by mixing the first and second components on the same support via co-precipitation or other means. In either case, having the first component in intimate contact with the second component is not necessary to achieve the improved performance; thus, there are large numbers of options available to combine the first and second components to achieve the desired improved performance provided the first and second components are as described.

The first and second components can be combined in the range of Au nanosized particles making up between 1% and 99% of the composite catalyst and Platinum group metal nanosized particles between 99% and 1% of the composite catalyst. In different embodiments, the composite catalyst has a percentage of Au nanosized particles precisely, about, at least, up to, or less than 90%, 80%, 70%, 60%, 50%, 40%, 30%, 20%, 10%, or a percentage of Au nanosized particles within a range bounded by any two of the foregoing values. In other embodiments, the composite catalyst has a percentage of Platinum group metal nanosized particles precisely, about, at least, up to, or less than 90%, 80%, 70%, 60%, 50%, 40%, 30%, 20%, 10%, or a percentage of Platinum group metal nanosized particles within a range bounded by any two of the foregoing values. In one embodiment, the Au nanosized particles will make up between 40% and 60% of the composite catalyst and the Platinum group metal nanosized particles will make up between 60% and 40% of the composite catalyst.

It is the combination of the first and second components of the composite catalyst that created unexpected results indicating a synergistic combination that results in the combination of the materials creating a composite catalyst with superior low temperature performance over either of the components individually. For example, the composite catalysts of the present invention are capable of catalyzing the oxidation of CO to $CO_2$ at or around 150° C. in the presence of NO.

Surprisingly, a first component comprised of a gold-metal oxide core-shell nanoparticle physically mixed with a second component of a platinum nanoparticle gave higher CO and NO oxidation efficiencies at lower temperatures than either the gold-metal oxide or platinum catalysts alone. Thus, useful catalysts with improved low temperature oxidation performance can be used in many applications, including automotive exhaust emission control.

The composite catalyst of the invention can be used in any system in which it is beneficial to oxidize carbon monoxide. In one embodiment, the composite catalyst is an exhaust system. Such exhaust systems can be in an engine. For example, the engine can be in a motor vehicle, an airplane, etc. Or, the engine may be stationary and operate for the purpose of producing electricity.

In another embodiment, the composite catalyst is in an emission control system. The composite catalyst can be used in industrial processes that generate CO and other pollutants including power generation facilities and heating systems.

In another aspect, the invention provides for a method of oxidizing NO to $NO_2$. The method comprises oxidizing NO with the composite catalyst. The conversion of NO to $NO_2$ may facilitate the further control of NO emissions or potentially be utilized in industrial processes that require $NO_2$.

In yet another aspect, the invention provides for a method of controlling the ratio of NO to $NO_2$ in an exhaust stream. The exhaust stream can be in the presence of CO. The method comprises oxidizing the nitric oxide with the composite catalyst. In particular, for the reduction of NO and $NO_2$ emissions over a selective catalytic reduction catalyst with an ammonia based reductant, the preferred chemistry entails the reaction of equal NO and $NO_2$ moles with $NH_3$ for the highest kinetic rate reaction to occur. Thus, utilizing the invention upstream of a selective catalytic reduction catalyst to convert the typically NO dominant emissions from an engine to a 1:1 mixture of $NO:NO_2$ would improve the reduction of the NO and $NO_2$ emissions to the desired $N_2$ product.

EXAMPLES

Example 1

Materials and Methods

All chemicals were used as received and purchased from Aldrich unless otherwise stated, copper(II) acetate, 98%; gold(III) chloride trihydrate, ACS reagent; 1-octadecene, tech, 90%; oleylamine, approximate C18 content 80-90%; oleic acid technical grade, 90%; ethylenediamine, Reagentplus, 99%; and fumed silica, 99.8%.

Synthesis of $Au(en)_2Cl_3$ (en=ethylenediamine)

Au nanoparticles supported on silica were prepared. To synthesize the $Au(en)_2Cl_3$ precursor, ethylenediamine (0.45 mL) was slowly added to an aqueous solution of $HAuCl_4 \cdot 3H_2O$ (1.0 g in 10.0 mL of $H_2O$) to form a transparent brown solution. De-ionized (DI) $H_2O$ was used. After stirring for 30 min, 70 mL of ethanol was added to induce precipitation. The final product was centrifuged, washed in ethanol, and dried overnight.

Synthesis of the $Au/SiO_2$ Catalyst $Au(en)_2Cl_3$ was dissolved in 100 mL of DI $H_2O$ to make 1.5 wt % Au loading on silica. A 1.0 M solution of NaOH was added drop wise to raise the pH to 10. Then 1.0 g of $SiO_2$ was added and the pH rapidly decreased. Over the next 30 min, 1.0 M NaOH solution was added to maintain the pH at 10.0. The mixture was then transferred to a 60° C. water bath for 2 h. The final product was collected by centrifugation, washed in $H_2O$, dispersed by a vortexer and centrifuged four times. The yellowish product was dried in a vacuum oven overnight at 55° C. and reduced at 150° C. in 10% $H_2$/Ar for 1 h to obtain a red powder. Calcination of the catalyst was performed at 500-600° C. in 10% $O_2$, 1% $H_2O$ and balance Ar.

Synthesis of the $AuCu/SiO_2$ Catalyst

AuCu alloy nanoparticles supported on $SiO_2$ were prepared by first dissolving $Cu(C_2H_3O_2)_2$ (0.05 mmol) into 1-octadecene (20 mL), oleic acid (1.7 mmol), and oleylamine (1.7 mmol) in a 100 mL 3-neck round-bottom flask. Then $Au/SiO_2$ (180 mg, 3.6 wt % Au, 0.039 mmol of Au) was added to the solution and the mixture was magnetically stirred under flowing Ar gas. The temperature was first raised to 120° C. for 20 minutes to remove water then increased to 305° C. for 1.5 h. The heating mantle was removed and the reaction mixture cooled to room temperature, was diluted in ethanol, and centrifuged at 7500 rpm for 7 min. The final product was washed by suspending the powder in ethanol and centrifuging four times before drying in air. ICP confirmed a 1.9 wt % total metal loading with a Au:Cu ratio of 1.9. Calcining the catalyst at 500-600° C. in 10% $O_2$ and 1% $H_2O$ results in a catalytically active core-shell (Au—CuO) structure (FIG. 1).

Characterization with XRD and TEM

X-ray diffraction (XRD) data were collected at room temperature on a PANalytical X'Pert Pro MPD diffractometer over the range from 30 to 90° 2θ using an X'Celerator RTMS detector. Transmission electron microscope (TEM) experiments were carried out on a Zeiss Libra 120 TEM operated at 120 kV.

Catalyst Evaluation

The micro-reactor consists of lean and rich gas banks controlled by a 4-way valve, a bypass line for flow equilibration and calibration, a mass spectrometer (SRS RGA100), and two NOx chemiluminescent analyzers (California Analytical) for simultaneous measurement of NOx and NO, with the difference giving $NO_2$. The gas flow rates were metered with mass flow controllers and the furnace temperature was adjusted using a proportional-integral-derivative (PID) controller. During the evaluation the heat was ramped from 50° C. to 600° C. at 10° C./min. The same batch of catalysts was used for the results described here, and a new sample was only loaded after hydrothermal aging was performed on the sample at 800° C. The catalysts showed good repeatability and stability after the initial degreening steps at 550° C.; no deactivation was observed through the course of normal gas exposure.

Example 2

AuCu Catalysts have Ability to Oxidize CO at Low Temperatures

Figure 2:
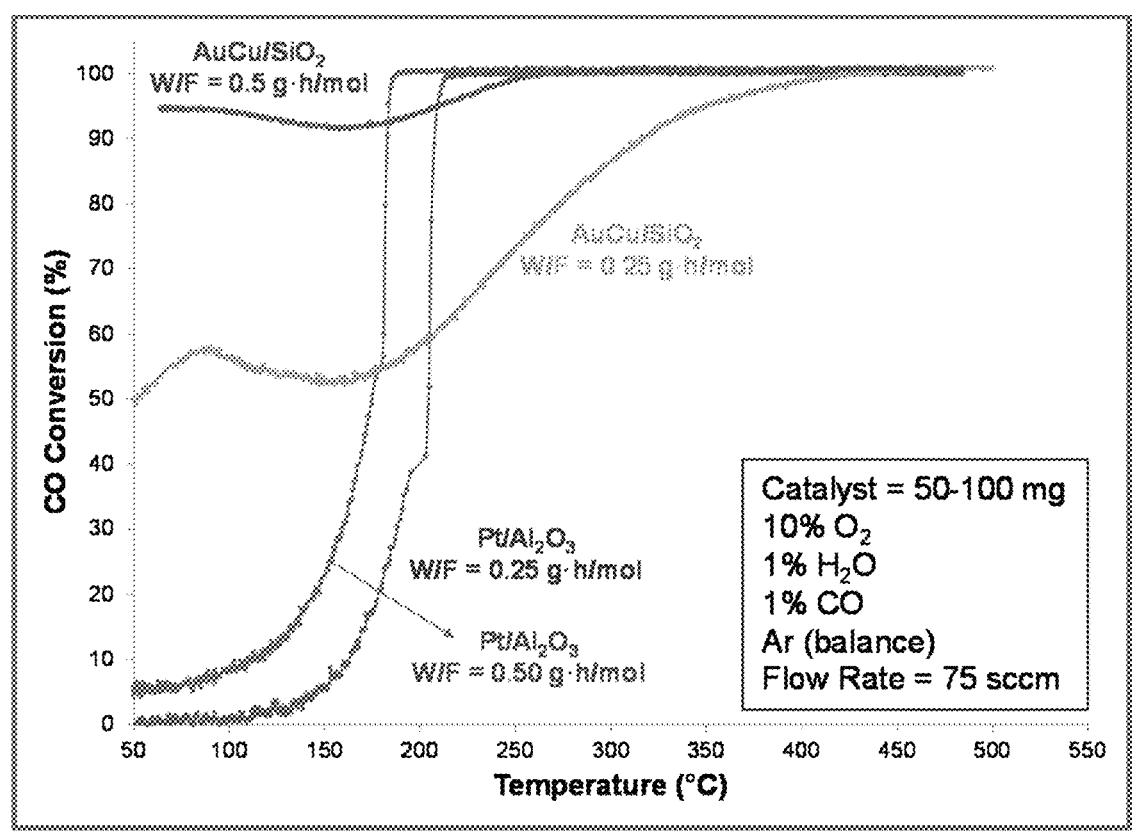
FIG. 2. CO conversion, with different weight to flow, ratios (W/F), as a function of reaction temperature for $AuCu/SiO_2$ and $Pt/Al_2O_3$. Reaction conditions are in inset of the figure with a temperature ramp of 10° C./min.

Silica supported AuCu catalysts have shown a remarkable ability to oxidize CO at low reaction temperatures after pretreating the alloy to form a $Au-CuO_x$ heterostructure in air between 300 and 500° C. for an hour. However, the activity and stability of the $AuCu/SiO_2$ catalyst in simulated automotive exhaust conditions has not yet been investigated. $Pt/Al_2O_3$ with a metal loading of 1.5 wt % Pt was used as a reference for comparison in this study. The catalyst amount and the reaction flow rate were normalized to weight to flow ratios (W/F=g·h/mol) due to the significant difference in catalyst volume for the two supports. As can be seen in FIG. 2, $Pt/Al_2O_3$ shows typical CO conversion behavior under lean conditions (10% $O_2$, 1% $H_2O$ and Ar) with a light-off temperature ($T_{50}$=50% conversion) between 150° C.-200° C., which is not greatly affected by adjustments in the weight to flow ratio. The $AuCu/SiO_2$ catalyst (1.5 wt % Au) under the same conditions shows very distinct differences from $Pt/Al_2O_3$ (1.5 wt % Pt). First, $AuCu/SiO_2$ is capable of oxidizing nearly 60% and 95% of the CO at a W/F=0.25 or 0.5 g·h/mol below 100° C., respectively. Little to no activity of $Pt/Al_2O_3$ is observed below 150° C. A second unique feature of the $AuCu/SiO_2$ is a dip in the conversion curve, which begins near 70° C. and begins to increase after 150° C. is reached. This type of behavior is common for Au based catalysts supported on $SiO_2$ because it is believed that the support stores $H_2O$, which is capable of dissociating $O_2$ on the perimeter of the Au particle and the support. Water may also react with carbonate species that form on the active sites, also responsible for decrease in activity. As temperature increases over 100° C., moisture starts to desorb from the catalyst which may be responsible for the drop in conversion. Between 100 and 150° C. another reaction mechanism appears to be active, likely associated with the presence of CuO.

Example 3

CO Oxidation in the Presence of other Exhaust Components

Figure 3A:
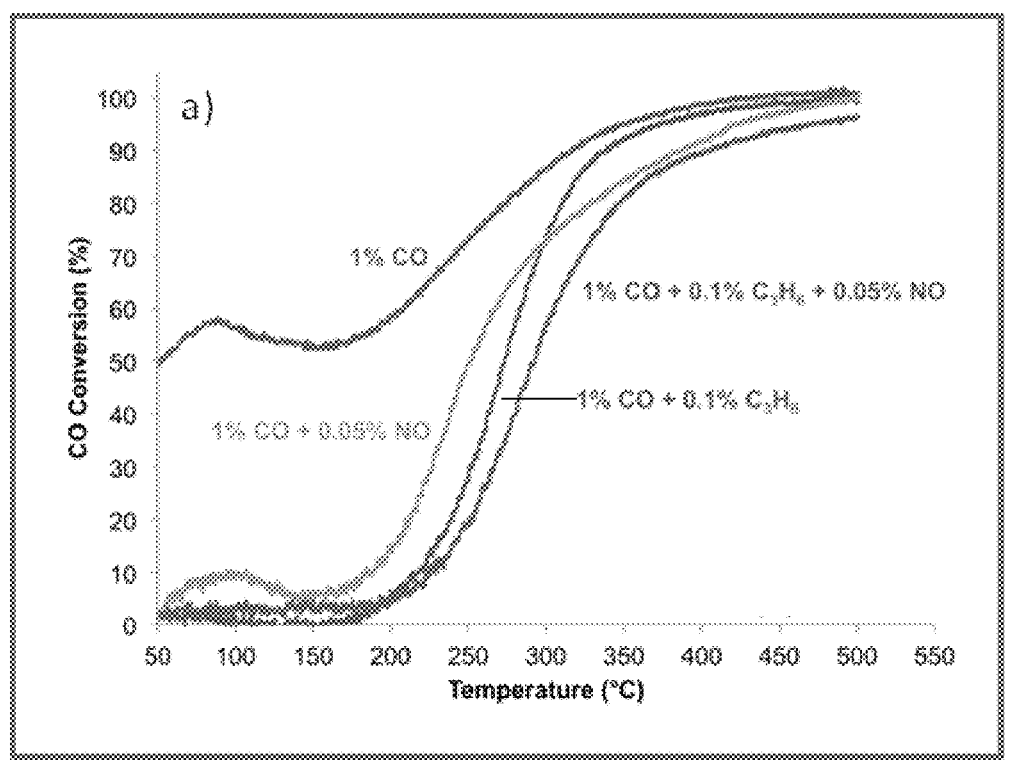
FIG. 3. CO conversion as a function of temperature using a (a) $AuCu/SiO_2$ or (b) $Pt/Al_2O_3$ catalyst and the impact of including 0.05% NO, 0.1% $C_3H_6$ or both gases with a W/F=0.25 g·h/mol. Catalysts were pretreated by calcination at 550° C. for 16 h in 10% $O_2$, 1% $H_2O$ and Ar (balance) at 75 sccm. Reaction conditions are in the inset of (b) with a temperature ramp of 10° C./min.
Figure 3B:
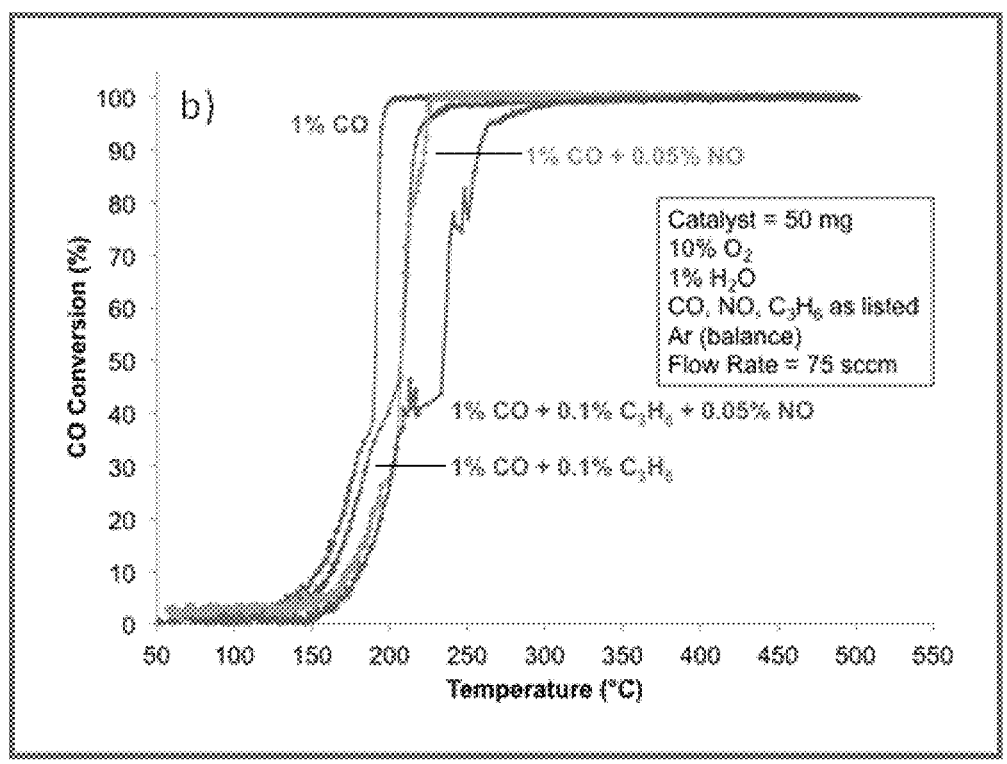

Propylene and nitric oxide were introduced into the gas stream to represent the basic components of automotive exhaust to study the effects they may have on CO oxidation on AuCu/SiO$_2$ and Pt/Al$_2$O$_3$, FIG. 3. Both catalysts were pretreated in 10% O$_2$, 1% H$_2$O and argon for 16 h before being exposed to the reaction stream at 600° C. The conversion of 1% CO was done under the same conditions from FIG. 2 and all reactions were done with a W/F=0.25 g·h/mol. The light-off temperature for CO oxidation, when AuCu/SiO$_2$ was used in FIG. 3a, significantly increased to higher temperatures (>200° C.) once 1000 ppm of C$_3$H$_6$ or 500 ppm of NO was individually or simultaneously introduced into the reaction stream. On the other hand, Pt/Al$_2$O$_3$ was found to be much more resistant to the inhibiting effects of C$_3$H$_6$ and NO and a less dramatic increase in the light-off temperature was observed (~50° C. increase in T$_{50}$). It is evident from the data that NO and propylene compete with CO for active sites on the catalyst surface and suppress the CO oxidation reaction until temperatures near 200° C. are reached. Thus under these conditions, Pt/Al$_2$O$_3$ has significantly better activity than AuCu catalysts because it is not as affected by NO and C$_3$H$_6$.

Example 4

Combining AuCu/SiO$_2$ and Pt/Al$_2$O$_3$ into a Physical Mixture

Figure 4:
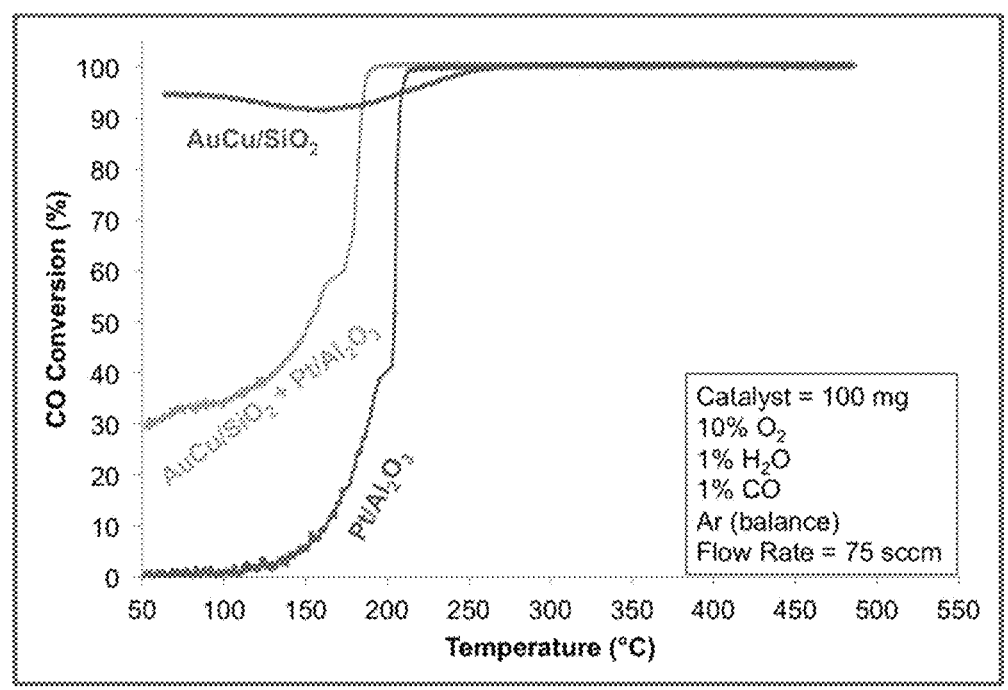
FIG. 4. CO conversion as a function of reaction temperature comparing $Pt/Al_2O_3$, $AuCu/SiO_2$ and a physical mixture of $AuCu/SiO_2$ and $Pt/Al_2O_3$ under the reaction conditions shown in the inset with a W/F ratio of 0.50 g·h/mol; temperature ramp of 10° C./min.
Figure 5A:
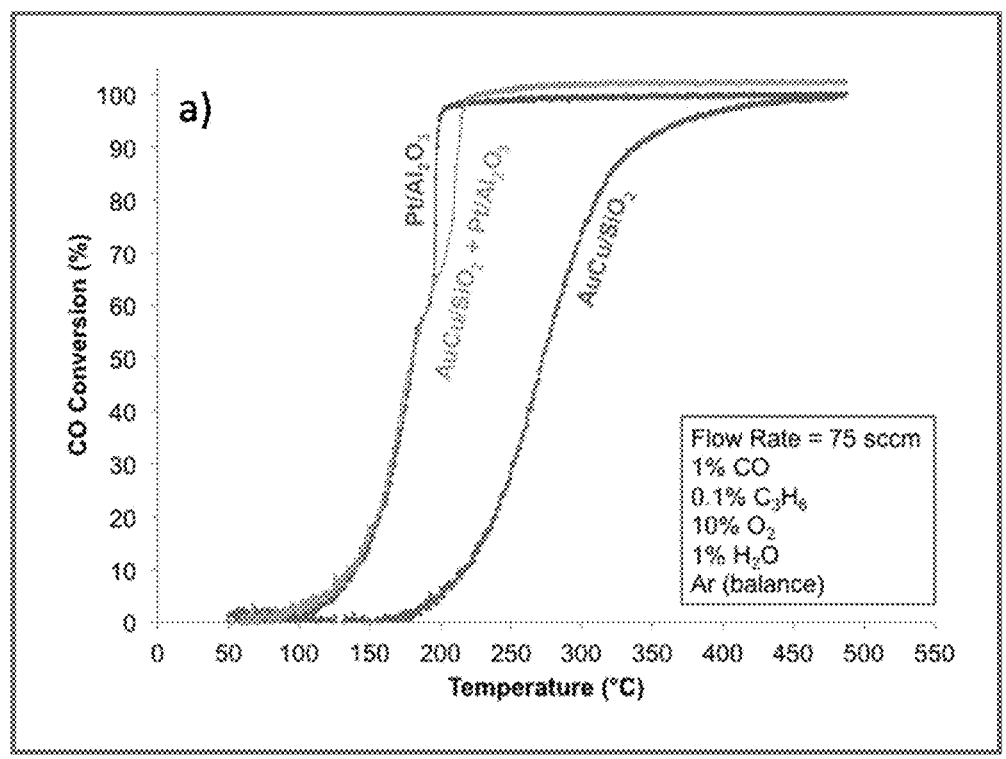
FIG. 5. Conversion of (a) CO or (b) propylene as a function of temperature using $AuCu/SiO_2$, $Pt/Al_2O_3$ or the $AuCu/SiO_2$—$Pt/Al_2O_3$ physical mixture catalysts (W/F=0.25 g·h/mol); temperature ramp of 10° C./min.
Figure 5B:
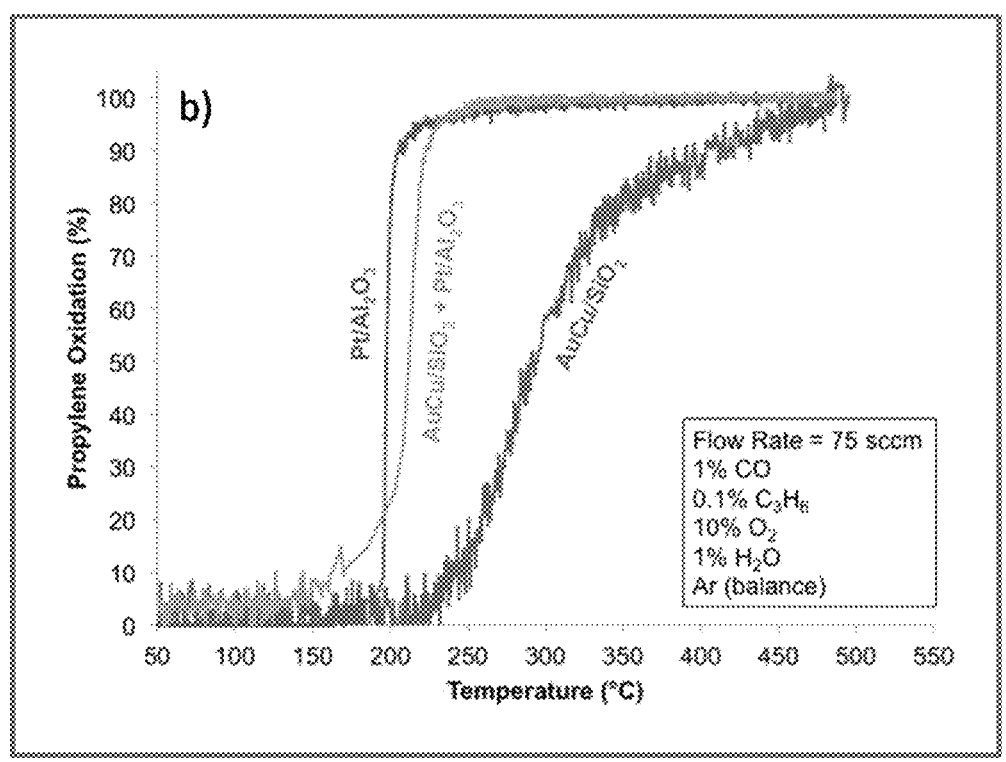

It can clearly be seen that each catalyst has its own advantages such as, Au—CuO$_x$/SiO$_2$ for low temperature CO activity and Pt/Al$_2$O$_3$ for being more resistant to hydrocarbon and NO poisoning. Investigating catalysts mixtures is a typical pathway towards finding synergistic relationships. FIG. 4 shows the effects of combining AuCu/SiO$_2$ and Pt/Al$_2$O$_3$ into a physical mixture. A 100 mg total loading and a W/F=0.50 g·h/mol was used for all samples evaluated. Low temperature CO conversion was observed with a T$_{50}$~150° C. and a T$_{90}$~175° C. As seen in FIG. 2, it was observed that decreasing the contact time with the AuCu catalyst significantly decreased the low temperature CO oxidation activity, as a similar conversion was observed for the physical mixture here as was observed for the AuCu catalyst when W/F=0.25 g·h/mol. In the case of FIG. 4, even though the total catalyst weight is equal in all three examples, the Pt/Al$_2$O$_3$ dilutes AuCu/SiO$_2$ catalysts and the low temperature activity decreases, but is still improved when compared to the pure Pt/Al$_2$O$_3$ catalyst. When 1000 ppm of C$_3$H$_6$ was added into the reaction stream, FIG. 5, the AuCu/SiO$_2$—Pt/Al$_2$O$_3$ mixture demonstrated a T$_{50}$ decrease from ~260° C. (AuCu/SiO$_2$ only) to ~160° C., similar to Pt/Al$_2$O$_3$. The simultaneous conversion of propylene shows a similar trend where the AuCu/SiO$_2$—Pt/Al$_2$O$_3$ is nearly identical to the Pt/Al$_2$O$_3$ catalysts, T$_{50}$ is 210° C. compared to 200° C., while AuCu/SiO$_2$ has a T$_{50}$=~300° C. The fact that the AuCu/SiO$_2$—Pt/Al$_2$O$_3$ mixture shows a similar catalytic activity, indicates Pt/Al$_2$O$_3$ is the dominant catalyst in the presence of C$_3$H$_6$, while Au—CuO activity is limited and does not result in enhanced CO activity, thus no synergy is observed here.

Example 5

Synergistic Relationship

Figure 6A:
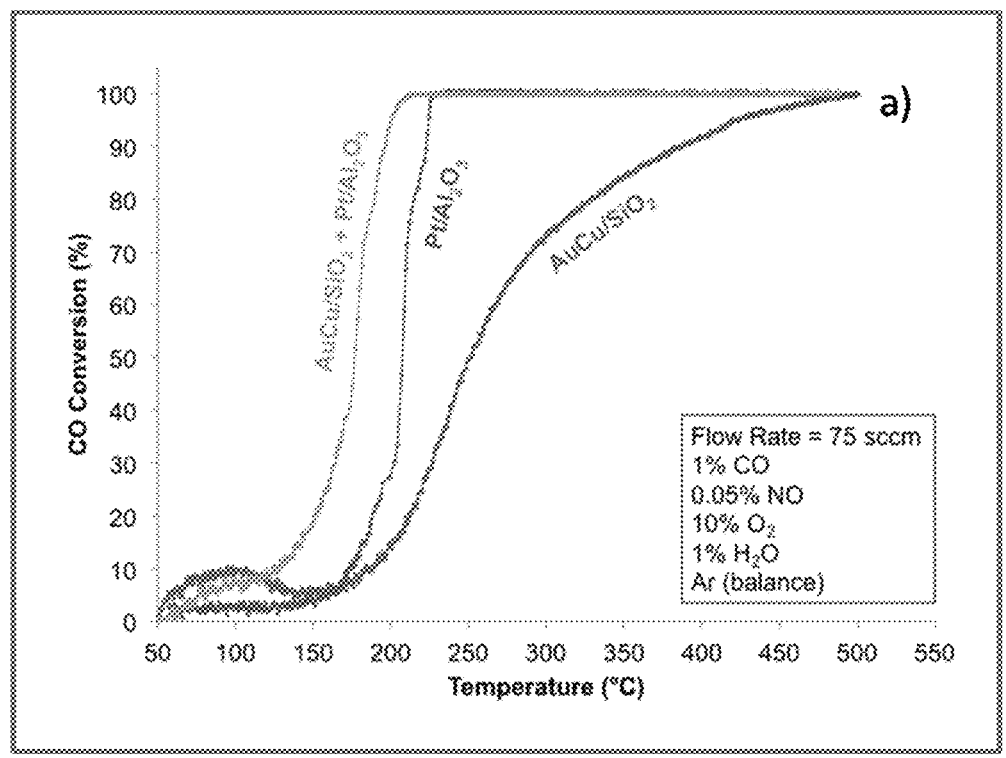
FIG. 6. Conversion of (a) CO and (b) NO over a $AuCu/SiO_2$, $Pt/Al_2O_3$ and $AuCu/SiO_2$—$Pt/Al_2O_3$ mixture catalysts with 1% CO, 500 ppm NO, 1% $H_2O$, 10% $O_2$ and Ar with a W/F=0.25 g·h/mol. In the case of the orange curve the reaction stream was composed of 500 ppm NO, 1% $H_2O$, 10% $O_2$ and Ar. Temperature ramp of 10° C./min for each study. The dashed line represents the theoretical $NO/NO_2$ equilibrium.
Figure 6B:
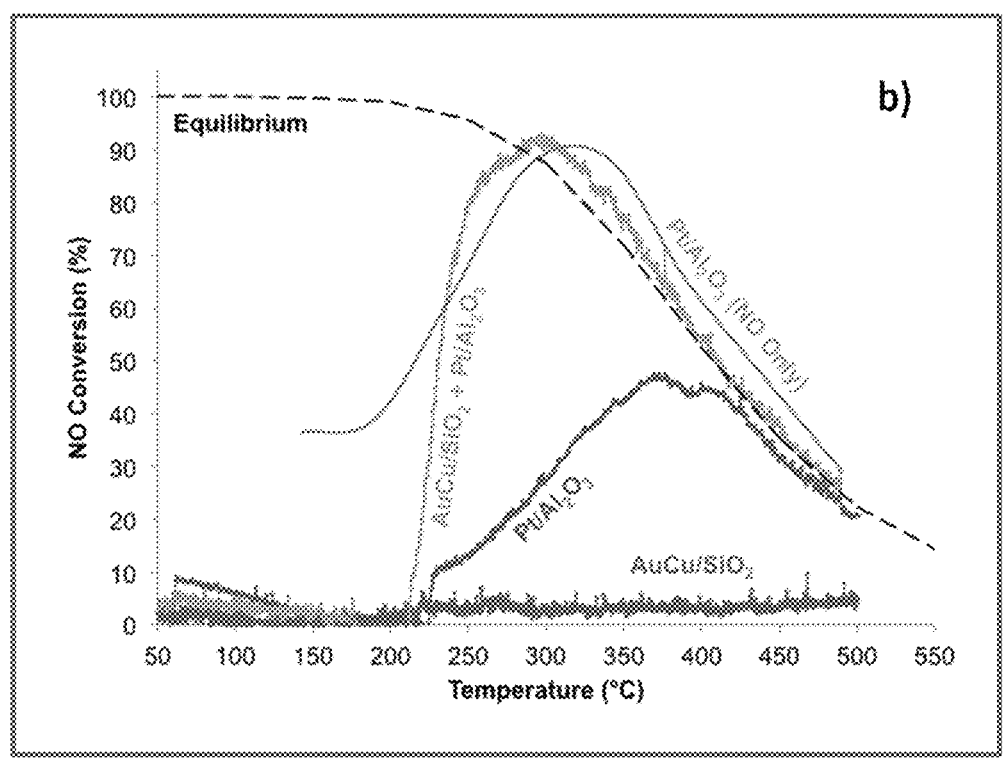

Introducing 500 ppm of NO into the reaction stream (1% CO, 1% H$_2$O, 10% O$_2$ and Ar) with a W/F=0.25 g·h/mol, leads to a significant synergy between the Au—CuO$_x$/SiO$_2$—Pt/Al$_2$O$_3$ catalyst mixture. FIG. 6a shows that while the AuCu/SiO$_2$ catalyst was significantly deactivated with the presence of NO, the physical mixture of the two catalysts decrease the light-off temperature by nearly 35° C. Furthermore, the oxidation of NO to NO$_2$ increases to 90% at ~300° C. (in line with the NO/NO$_2$ equilibrium as shown in FIG. 6b) while the Pt/Al$_2$O$_3$-only catalyst peaks at 40-50% conversion between 350° C.-450° C. The AuCu/SiO$_2$ catalyst was completely inactive for the oxidation of NO into NO$_2$. NO has a stronger binding energy on Pt and Pd catalysts, but when AuPd alloy catalyst is used an enhancement of CO oxidation was observed due to the weakening of NO on the catalyst surface. However, in this case the Au, Cu and Pt are not alloyed and the two catalyst systems must be working in synergy. It is likely that Pt/Al$_2$O$_3$ is able to oxidize NO and reduce the inhibition on the AuCu/SiO$_2$ surface. At the same time, the AuCu/SiO$_2$ catalyst can oxidize CO that allows more active sites on the Pt/Al$_2$O$_3$ catalyst to remain open for the oxidation of NO. The orange curve in FIG. 6b shows that if CO is removed from the reaction stream, NO is only present and is no longer competing with CO for active sites, the same level of NO conversion can be obtained. Interestingly, in the Pt/Al$_2$O$_3$-only case 100% CO conversion is achieved above 200° C., yet the NO to NO$_2$ oxidation does not reach the levels observed in the CO-free case, so this synergistic relationship goes beyond simple removal of the CO from the gas-phase.

Example 6

Investigation of Thermal Stability by Ageing Catalyst

Figure 7A:
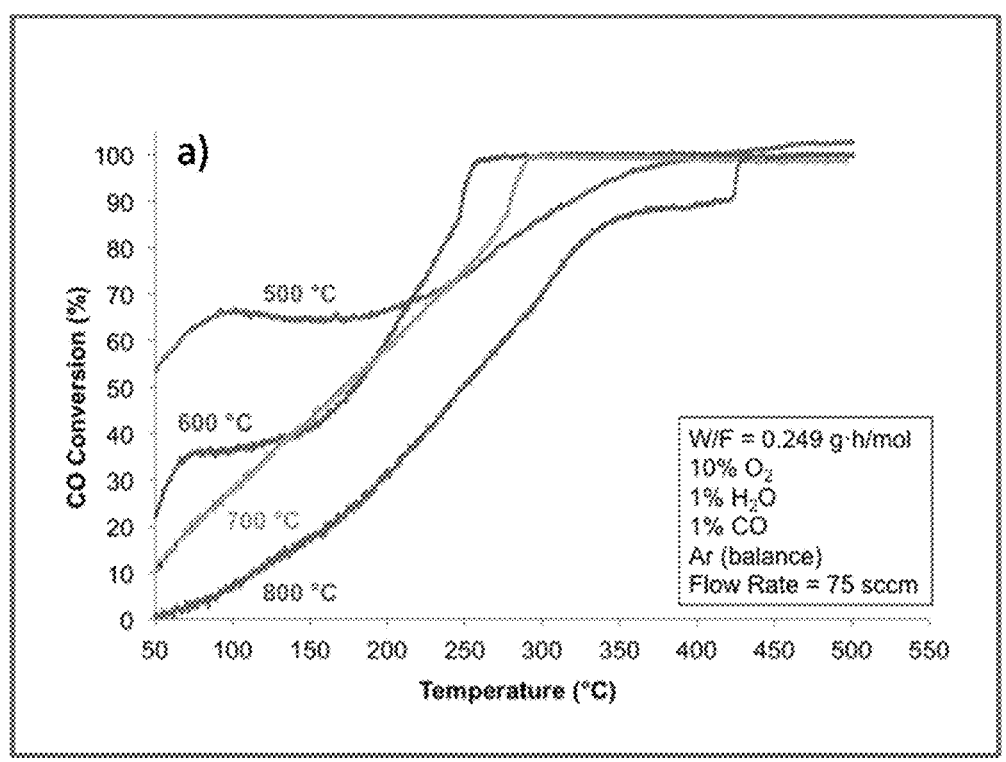
FIG. 7. (a) CO conversion as a function of temperature after thermal ageing at 500° C., 600° C., 700° C. and 800° C. for 10 h under 10% $O_2$, 1% $H_2O$ and Ar. Reaction conditions: 1% CO, 1% $H_2O$, 10% $O_2$ and Ar with a W/F=0.5 g·h/mol at a flow rate of 75 sccm with a temperature ramp of 10° C./min. (b) XRD of the Au—$CuO/SiO_2$ catalyst after undergoing the specified thermal ageing.
Figure 7B:
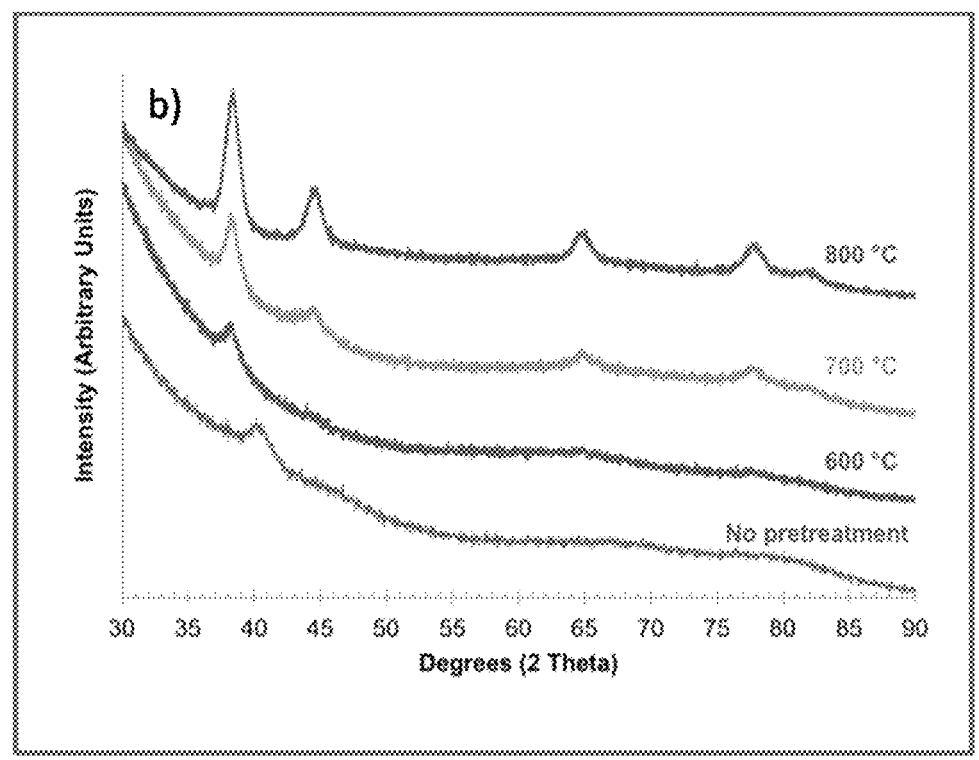

After evaluating the effects of introducing different reactants (CO, C$_3$H$_6$ and NO) into the gas stream, the thermal stability of the AuCu/SiO$_2$ was investigated by ageing the catalyst in 10% O$_2$, 1% H$_2$O and Ar for 10 h. FIG. 7a shows that ageing at 500° C. produced the most active catalyst at very low temperatures (T<100° C.), but after 600 and 700° C. the catalyst was able to reach 100% conversion at even lower temperatures than the 500° C.-aged sample, i.e. 240-270° C. for 600 and 700° C. aged samples versus >350° C. for the 500° C. sample. As the ageing temperature increased, the low temperature (T<200° C.) activity of the Au—CuO$_x$/SiO$_2$ further diminished, and after 800° C. there was significant catalyst deactivation observed at the higher temperatures as well (T>300° C.). This is consistent with a decrease in the active surface area due to particle sintering. The aged catalysts were analyzed in powder XRD with a focus on identifying the metal particle size. The as-synthesized catalysts, made by the diffusion of Cu atoms into supported Au nanoparticles, formed an alloy with a face-centered cubic structure and the particle size was approximated, using the Scherrer equation, to be 4.0 nm in diameter. Upon heating the AuCu/SiO$_2$ catalyst to higher temperatures in an oxidizing atmosphere several changes in the XRD pattern can be observed. First the face-centered cubic pattern shifted to lower 2θ values, the position of pure Au, which indicates the lattice is expanding as Cu is leaving the alloy system. CuO is not detected by XRD because it is either amorphous or the particle size is too small to be detected. As the ageing temperature increases to 800° C. the XRD peaks become more intense and sharper signifying the particle size is growing and the nanocrystals are becoming more crystalline. After heating to 600° C., 700° C. and 800° C. for 10 h under an oxidizing atmosphere the Scherrer equation approximated the crystallite size to be 5.7 nm, 7.3 nm and 9.0 nm respectively. The TEM images, in FIG. 8, agree relatively well with the XRD data and show that after ageing at 600° C. for 10 h a high particle density still remains (higher metal dispersion), but by 800° C. there is a lower particle density with larger particles (lower metal dispersion).

What is claimed is:

1. A composite catalyst comprising:
   a. a first component comprising nanosized gold particles on a solid support; and
   b. a second component comprising nanosized platinum group metals (Pt, Pd, Rh),
   wherein the nanosized gold particles comprises a gold core surrounded by a metal oxide shell.

2. A composite catalyst according to claim 1, wherein the composite catalyst catalyzes the oxidation of CO to $CO_2$ at or around 150° C. while in the presence of NO.

3. A composite catalyst according to claim 1, wherein the metal oxide shell is selected from the group consisting of copper oxide, iron oxide, nickel oxide, manganese oxide, tin oxide, palladium oxide, and silver oxide.

4. A composite catalyst according to claim 1, wherein the solid support comprises silica ($SiO_2$).

5. A composite catalyst according to claim 1, wherein the solid support comprises ceria ($CeO_2$).

6. A composite catalyst according to claim 1, wherein the solid support comprises zirconia ($ZrO_2$).

7. A composite catalyst according to claim 1, wherein the solid support comprises alumina ($Al_2O_3$).

8. A composite catalyst according to claim 1, wherein the solid support consists of a mixture of any of the components $SiO_2$, $CeO_2$, $ZrO_2$, $Al_2O_3$ or any other metal oxides.

9. A component in an exhaust system in an engine comprising the composite catalyst of claim 1.

10. An emission control system comprising the composite catalyst of claim 1.

11. A method of oxidizing NO to $NO_2$, the method comprising oxidizing the nitric oxide with the composite catalyst of claim 1.

12. A method of controlling the ratio of NO to $NO_2$ in an exhaust stream in the presence of CO, the method comprising oxidizing the nitric oxide with the composite catalyst of claim 1.

13. A motor vehicle comprising the composite catalyst of claim 1.

* * * * *